(12) United States Patent
Williams

(10) Patent No.: US 10,382,602 B2
(45) Date of Patent: Aug. 13, 2019

(54) DATA COMMUNICATIONS BACKPACK

(71) Applicant: Plum Laboratories, LLC, Springfield, TN (US)

(72) Inventor: Dawson Lee Williams, Springfield, TN (US)

(73) Assignee: Plum Laboratories, LLC, Springfield, TN (US)

( * ) Notice: Subject to any disclaimer, the term of this patent is extended or adjusted under 35 U.S.C. 154(b) by 25 days.

(21) Appl. No.: 15/708,061

(22) Filed: Sep. 18, 2017

(65) Prior Publication Data

US 2018/0084091 A1    Mar. 22, 2018

Related U.S. Application Data

(60) Provisional application No. 62/395,394, filed on Sep. 16, 2016.

(51) Int. Cl.
| | |
|---|---|
| *H04M 1/21* | (2006.01) |
| *H04M 1/02* | (2006.01) |
| *A45F 3/04* | (2006.01) |
| *A45F 3/00* | (2006.01) |

(52) U.S. Cl.
CPC ............... *H04M 1/026* (2013.01); *A45F 3/04* (2013.01); *H04M 1/0249* (2013.01); *H04M 1/21* (2013.01); *A45F 2003/003* (2013.01); *H04M 2001/0204* (2013.01)

(58) Field of Classification Search
CPC ............................. H04M 1/026; H04M 1/0249
See application file for complete search history.

(56) References Cited

U.S. PATENT DOCUMENTS

| | | | |
|---|---|---|---|
| 5,055,793 A | 10/1991 | Mulcahey | |
| 5,461,880 A | 10/1995 | Bolton et al. | |
| 6,015,072 A * | 1/2000 | Young .................. | A45C 7/0063 |
| | | | 190/103 |
| 6,422,669 B1 | 7/2002 | Salvatori et al. | |
| 7,421,265 B1 | 9/2008 | Liu | |
| 2007/0104169 A1 | 5/2007 | Polson | |
| 2009/0038901 A1 | 2/2009 | Pomerantz | |
| 2009/0140020 A1 | 6/2009 | Schlipper | |

(Continued)

FOREIGN PATENT DOCUMENTS

JP            2008107888 A      5/2008

*Primary Examiner* — Tuan H Nguyen
(74) *Attorney, Agent, or Firm* — Waller Lansden Dortch & Davis, LLP; Blake M. Bernard

(57) ABSTRACT

A data communications backpack apparatus is disclosed having a backpack carrier. A power supply can be positioned in the backpack carrier. A router device can be positioned in the backpack carrier, the router device in electrical communication with the power supply. An antenna array can be positioned in the backpack carrier, the antenna array in electrical communication with the router device, the antenna array including one or more cellular antennas and one or more wireless networking antennas. The backpack carrier can include an upper opening extending into a central storage area, a first side pocket, a second side pocket, and a lower compartment positioned below the central storage area. The power supply can be positioned in the first side pocket, the router device can be positioned in the second side pocket, and the antenna array can be positioned in the lower compartment.

19 Claims, 11 Drawing Sheets

(56) References Cited

U.S. PATENT DOCUMENTS

| | | |
|---|---|---|
| 2010/0197222 A1 | 8/2010 | Scheucher |
| 2011/0011760 A1 | 1/2011 | Habersetzer |
| 2011/0279337 A1 | 11/2011 | Corwin et al. |
| 2012/0235635 A1* | 9/2012 | Sato .................. H01Q 1/243 320/108 |
| 2013/0105354 A1 | 5/2013 | Wyner et al. |
| 2013/0109449 A1 | 5/2013 | Desclos et al. |
| 2014/0217862 A1 | 8/2014 | Rayner |
| 2014/0304921 A1 | 10/2014 | Collins et al. |
| 2014/0329458 A1 | 11/2014 | Charelle et al. |
| 2015/0173472 A1 | 6/2015 | Gierke et al. |
| 2015/0201723 A1 | 7/2015 | Rayner et al. |
| 2015/0244061 A1 | 8/2015 | Galeev |
| 2016/0272774 A1 | 9/2016 | Snider et al. |
| 2017/0024537 A1* | 1/2017 | Ferlito ................ G06F 19/3418 |
| 2017/0187107 A1 | 6/2017 | Charette |
| 2018/0020793 A1* | 1/2018 | Rao .................. A45C 15/00 320/114 |

* cited by examiner

DATA COMMUNICATIONS BACKPACK

CROSS-REFERENCES TO RELATED APPLICATIONS

This application is a non-provisional of U.S. patent application Ser. No. 62/395,394 filed Sep. 16, 2016 entitled DATA COMMUNICATIONS CASE HAVING AN INTERNAL ANTENNA ARRAY, of which is herein incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This present disclosure generally relates to the field of data communications.

More specifically, the present disclosure relates to facilitating various types of communications, including secure, high-speed data communications and voice communications when current end user devices may detect that little or no wireless or voice signal is available. Network failures and slow data communications occur for a myriad of reasons—from crowded networks to natural disasters—leading to frustrations in a society that is growing ever dependent on the ability to transmit and receive communications, including secure, high-speed data. Further, obtaining data and voice communication in remote areas without readily available power supplies, internet connectivity, and/or where cellular coverage is weak or non-existent can be difficult if not impossible, which can be especially undesirable for public safety officials and others that often rely on data and voice communications for work projects in rural environments and in disaster relief situations.

Conventional data communication units are large, bulky, and difficult to transport, and thus are typically retained in a generally fixed or permanent location. Additionally, conventional portable antennas are typically located on the outside of a data communications unit, creating a cumbersome device that is unaesthetically pleasing where the antennas are freely exposed to external wear, tear and breakage. Damage to the communications antennas can undesirably affect the integrity of the data communications unit.

What is needed then are improvements to data communication devices.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a data communications backpack apparatus including a backpack carrier. A rechargeable power supply can be positioned in the backpack carrier. A router device can be positioned in the backpack carrier, the router device in electrical communication with the power supply. An antenna array can be positioned in the backpack carrier, the antenna array in electrical communication with the router device, the antenna array including at least two cellular antennas and at least two wireless networking antennas. The backpack can be utilized to provide wireless and cellular communication capabilities in remote locations where communications signals can be weaker, in locations away from a power grid, or in situations where power and conventional wireless and cellular communication capabilities to an area has been lost or compromised.

Another aspect of the present disclosure is a data communications backpack apparatus having a backpack carrier with an upper opening extending into a central storage area. A first side pocket can be defined on the backpack carrier. A second side pocket can be defined on the backpack carrier. A lower compartment can be defined on the backpack carrier below the central storage area. A power supply can be positioned in the first pocket. A router device can be positioned in the second pocket, the router device in electrical communication with the power supply. An antenna array can be positioned in the lower compartment, the antenna array in electrical communication with the router device, the antenna array including one or more cellular antennas and one or more wireless networking antennas. In some embodiments, the backpack carrier can have a first lateral side and a second lateral side. The first pocket can be defined on the first lateral side, and the second pocket can be defined on the second lateral side.

In some embodiments, the apparatus can include an antenna support frame positioned in the lower compartment. The antenna array can be mounted to the antenna support frame. The antenna support frame can provide support and protection for the antenna array positioned in the lower compartment of the backpack carrier.

One objective of the present disclosure is to provide a portable data and voice communications system that allows for reliable wireless and cellular communications and/or GPS location services when power outages or signal disruptions occur.

Another objective of the present disclosure is to provide a portable, data and voice communications system that allows for reliable wireless and cellular communications and/or GPS locations services in areas where signal strength is weak or nonexistent.

Another objective of the present disclosure is to provide data communication equipment in a backpack carrier which can allow a user to carry or transport the data communications equipment on the user's back, freeing a user's hands during transport.

Numerous other objects, advantages and features of the present disclosure will be readily apparent to those of skill in the art upon a review of the following drawings and description of a preferred embodiment.

DETAILED DESCRIPTION

Figure 1:
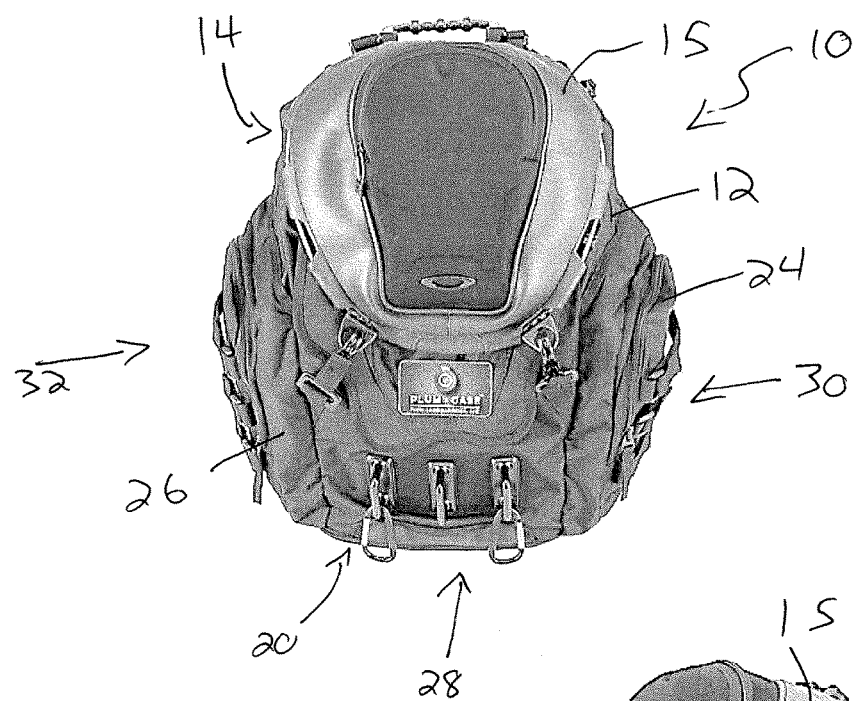
FIG. 1 is a front view of an embodiment of a data communications backpack apparatus of the present disclosure.
Figure 2:
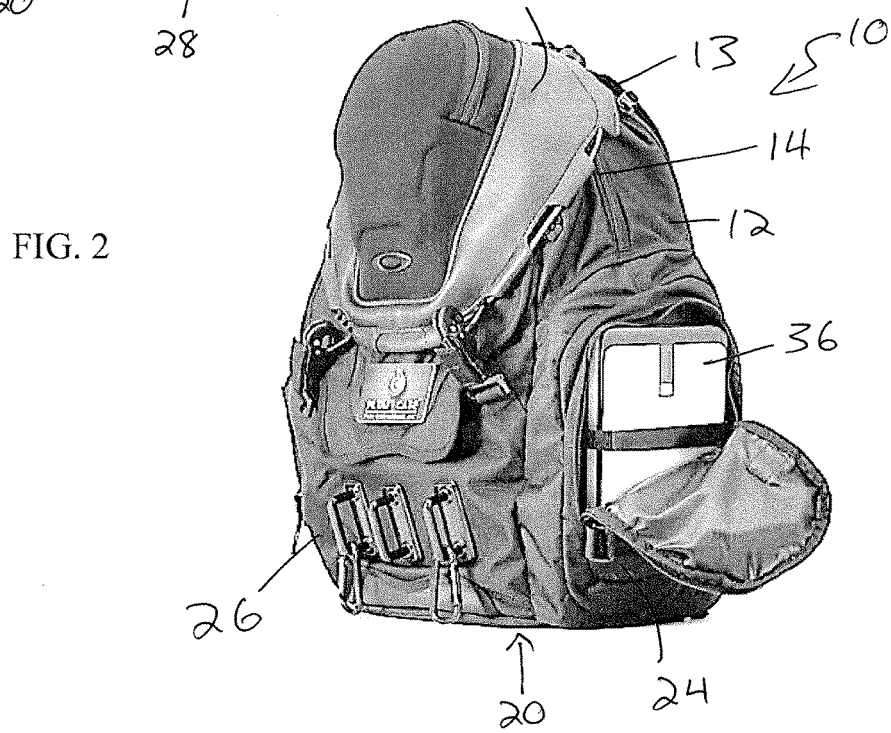
FIG. 2 is a first side perspective view of the apparatus of FIG. 1 showing a power supply positioned in a first side pocket of a backpack carrier.
Figure 3:
FIG. 3 is a second side perspective view of the apparatus of FIG. 1 showing a router device positioned in a second side pocket of the backpack carrier.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Figure 4:
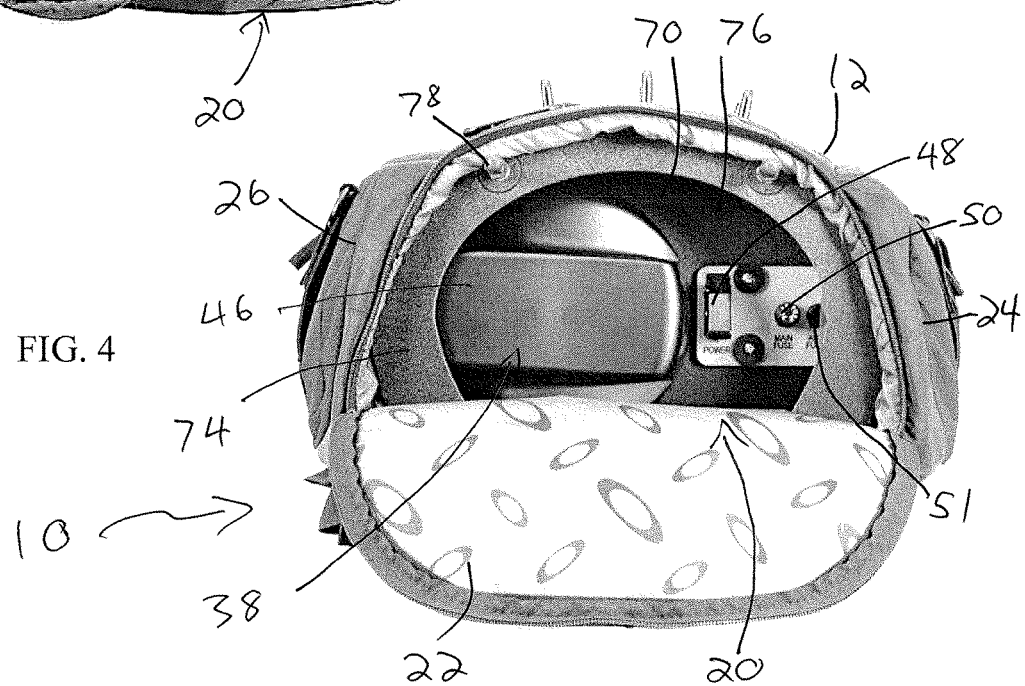
FIG. 4 is a bottom view of the apparatus of FIG. 1 showing an antenna array in an antenna housing positioned in a lower compartment of the backpack carrier.
Figure 5:
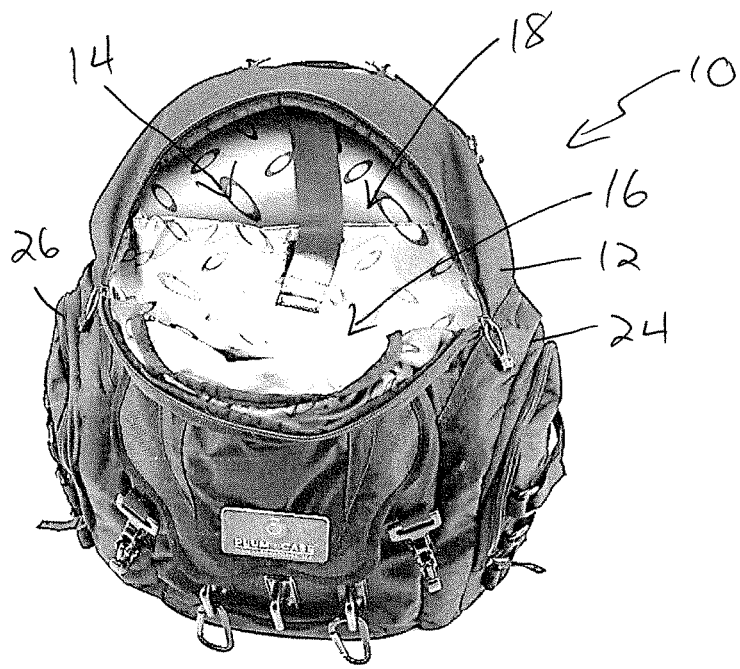
FIG. 5 is a top perspective view of the apparatus of FIG. 1 showing an upper opening and a central storage area of the backpack apparatus.
Figure 6:
FIG. 6 is a top view of the apparatus of FIG. 1 showing an internal pocket within the central storage area of the backpack carrier.

One embodiment of a portable data communications backpack apparatus 10 is shown in FIGS. 1-11. The apparatus 10 can include a backpack carrier 12. The backpack carrier 12 can include an upper opening 14 and a central storage area 16 for storing various items or supplies, similar to a conventional backpack. The backpack carrier 12 can include shoulder straps 13 which can be placed around the user's shoulders such that the backpack carrier 12 can be carried on or across the user's back, allowing for convenient hands free transport of the apparatus 10 between uses or during use. The backpack carrier 12 in some embodiments can be made of military grade materials and be of military style to help increase the durability of the backpack carrier 12. In some embodiments, the backpack carrier 12 can include a top cover 15 which can be secured over the upper opening 14 to enclose the central storage area 16 and protect items positioned within the backpack carrier 12. Backpack carrier 12 can include any suitable fasteners or closure mechanism for selectively securing the upper opening 14 in a closed position, including but not limited to, zippers, hooks, clips, buttons, clasps, snaps, etc. The central storage area 16 of the backpack carrier 12 in some embodiments can have one or more specialized compartments or internal pockets 18, as shown in FIGS. 5-6. For instance, in some embodiments, the internal pocket 18 of the backpack carrier 12 can be sized and configured as a laptop sleeve which can help protect a laptop or other computer electronics positioned within the sleeve 18 from other items within the central storage area 16.

Referring again to FIGS. 2-4 and 7-8, apparatus 10 can include a router device 34, a rechargeable wireless power supply 36, and an antenna array 38 positioned in the backpack carrier 12. The router device 34 can be in electrical communication with the power supply 36, such that the router device 34 can selectively receive power from power supply 36. The antenna array 38 can be in communication with the router device 34 such that the antenna array 38 can communicate electrical signals received by the antenna array 38 to the router device 34.

In certain embodiments, the router device 34 includes a built-in modem, a cellular gateway, WAN/LAN switchable ports, and a wireless network adapter. In certain embodiments, the router device 34 is capable of utilizing a firewall to block unauthorized access to communications sent and/or received via the router device 34. In certain embodiments, the router device 34 is capable of enabling multiple, segmented wireless networks, which can either be public or private wireless networks. The multiple wireless networks may have separate and different service set identifiers (SSIDs), each of which may be defined with passcodes. It is advantageous that the router device 34 be capable of encrypting data communications via various encryption protocols (e.g., encrypting WiFi communications with WEP, WPA, WPA2, etc.). It may also be advantageous that the router device 34 be programmable to allow for load balancing.

Further, each wireless network may be capable of having multiple users. In some embodiments, each wireless network and SSID can simultaneously accommodate multiple users. In some embodiments, the router device 34 can enable multiple separate wireless networks and SSIDs, such that the apparatus 10 can accommodate additional users on separate wireless networks. The router device 34 may utilize either static or dynamic IP addressing schemas. In certain embodiments, the router device 34 may enable 802.11 wireless connectivity utilizing distinct wireless frequencies (e.g., 2.4 GHz, 3.6 GHz, 4.9 GHz, 5 GHz, or 5.9 GHz). In certain embodiments, the router device 34 may enable 802.11 wireless connectivity in a, b, g, n, and/or ac standard configurations. In certain embodiments, the router device 34 may be programmed via a cloud based device manager. In certain embodiments, the router device 34 can include multiple cellular gateways such that the router device 34 may accommodate and communicate with more than one cellular carrier. In certain embodiments, the router device 34 may have multiple WAN/LAN/RJ-45 ports for failover if a user wishes to directly connect to the router device 34. In certain embodiments, the router device 34 may comprise a Gobi® radio.

Figure 12:
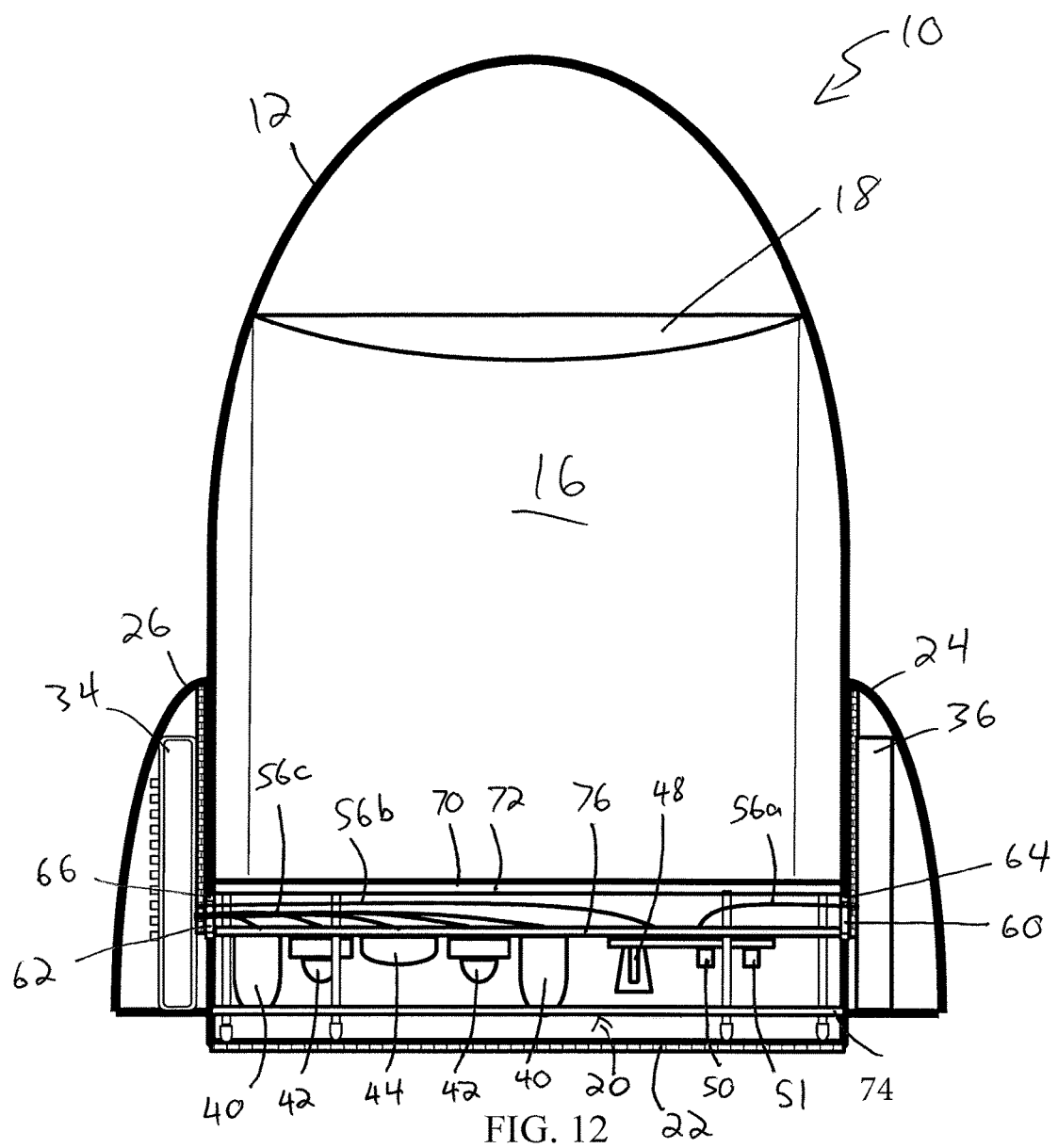
FIG. 12 is a front cutaway view of a second embodiment of a data communications backpack apparatus of the present disclosure having an antenna array with separate antennas each mounted to a support frame within a lower compartment of a backpack carrier.
Figure 13:
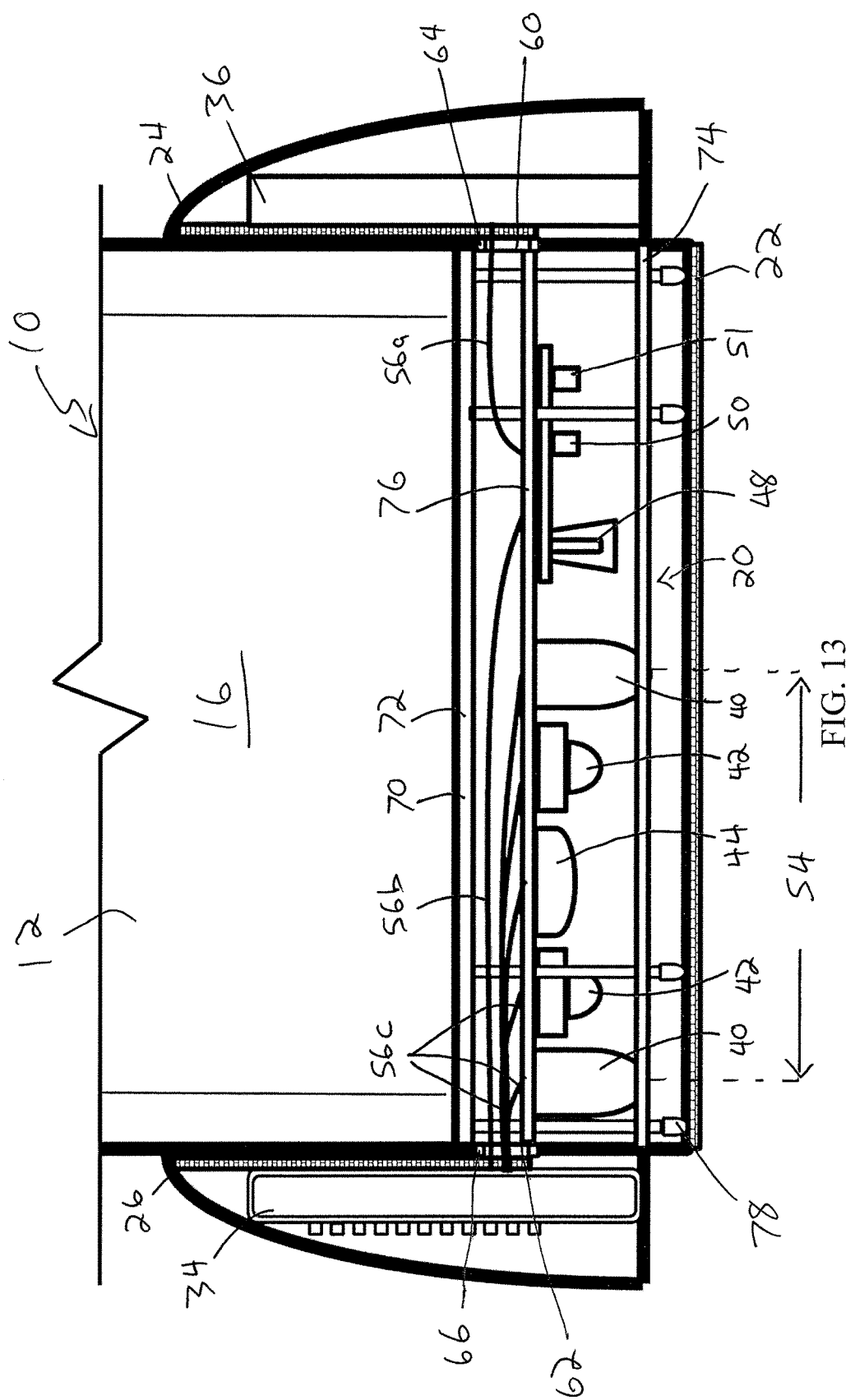
FIG. 13 is a detailed view of the data communications equipment of FIG. 12.

An antenna array 38 can be in electrical communication with the router device 34. The antenna array 38 can include one or more cellular antennas 40, one or more wireless networking (e.g. Wi-Fi®) antennas 42, and one or more global positioning system (GPS) antennas 44, as shown in FIGS. 12-13. In some embodiments, each antenna 40, 42, and 44 of antenna array 38 can be separately connected to the router device 34, as shown in FIG. 12.

In the embodiment shown in FIG. 12, two cellular antennas 40 are utilized to cover frequencies across 700 and 800 MHz as well as all global cellular frequencies from 698-960 MHz and 1710-2700 MHz. Cellular antennas 40 of the embodiment in FIG. 12 may require a ground plane. For the embodiment shown in FIG. 12 and discussed above, it has been discovered that vertical polarity cellular antennas requiring a ground plane may be particularly advantageous. Ground plane independent cellular antennas and horizontal polarity cellular antennas, however, may also be used in other embodiments. Cellular antennas 40 may allow for multiple user and multiple-input and multiple-output (MiMo) applications. In some embodiments, cellular antennas 40 can be positioned at a cellular antenna separation distance 54 from one another within backpack carrier 12 to help reduce frequency interference between cellular antennas 40. In one embodiment, cellular antenna separation distance 54 is at least 12 inches.

In certain embodiments, the wireless antennas 42 have a frequency range of 2.4-5 GHz. In certain embodiments, the wireless antennas 42 enable multiple user and multiple-input and multiple-output applications. In certain embodiments, a user may be able to utilize a virtual private network (VPN) with any combination of the multiple wireless networks and/or any wired network port. In certain embodiments, more than two wireless antennas can be used to further increase the capacity of the wireless network and to further support MiMo applications.

In certain embodiments, a GPS antenna 44 can be included in an antenna array 38 of a data communications backpack apparatus 10. In one embodiment, the GPS antenna 44 has an operating frequency of 1575 MHz, but many other operating frequencies may be utilized. In one embodiment, the GPS antenna 44 can have a low-noise amplifier gain of 26 decibels, and an impedance of 50 ohms. A plurality of GPS antennas may be used in some embodiments. The GPS antenna(s) may be active or passive GPS antennas.

The power supply 36 may be used to power any component in backpack carrier 12. In certain embodiments, the power supply 36 may be charged via an AC/DC adapter. The power supply 36 in other embodiments can also be configured to receive a charge via a solar panel charger, a cigarette lighter adapter, or various other chargers and/or adapters known in the art. The power supply 36 may have additional output ports for charging laptops, notebooks, notepads, cellular phones, etc. In certain embodiments, various adapters that allow for power to be supplied to other external components may also be housed within the backpack carrier 12 and connected to the power supply 36.

In some embodiments, each of the antennas of antenna array 38 can be contained together within an antenna housing 46, as shown in FIGS. 4 and 7-9. Antenna housing 46 can provide a layer of protection for the antennas of the antenna array 38. Having antennas within an antenna housing 46 can help protect the antennas from external wear, tear and breakage. Antenna array 38 and antenna housing 46 can also be described as being a singular antenna with multiple antenna elements. In one embodiment, the antenna housing 46 can contain five isolated high performance antenna elements, including two cellular antenna elements utilizing distinct wireless frequencies and supporting MiMo; two dual band wireless antenna elements supporting MiMo and diversity operation for WIFI and WiMax wireless networks; and one GPS antenna element. In some embodiments, the antenna elements in antenna array housing 46 can be ground plane independent such that antenna array 38 can be positioned in various orientations within the backpack carrier 12, and the antenna elements can maintain a generally high performance even when mounted on a non-metallic surface or ground plane.

Figure 7:
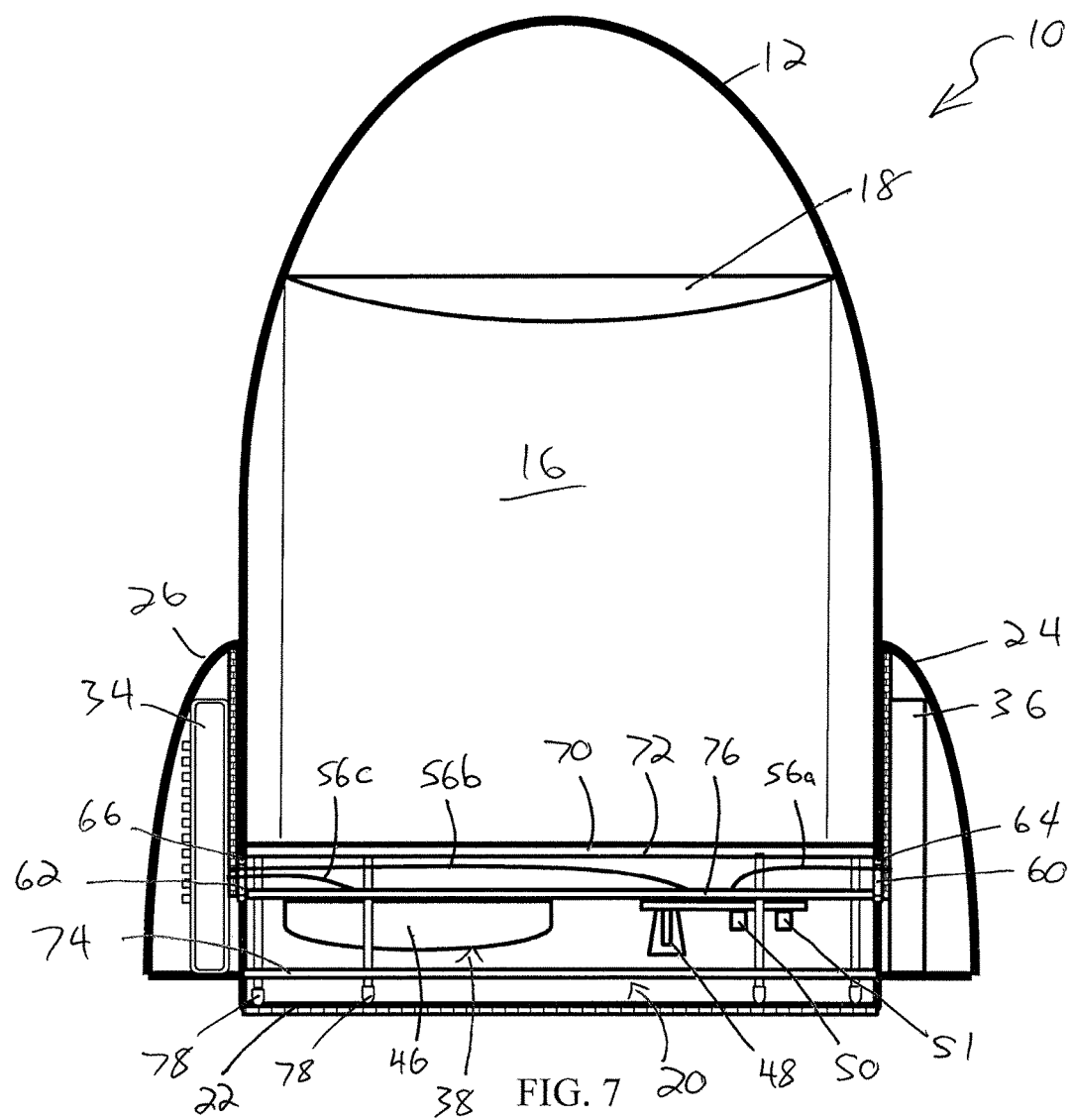
FIG. 7 is a front cutaway view showing the internal components of the apparatus of FIG. 1.
Figure 8:
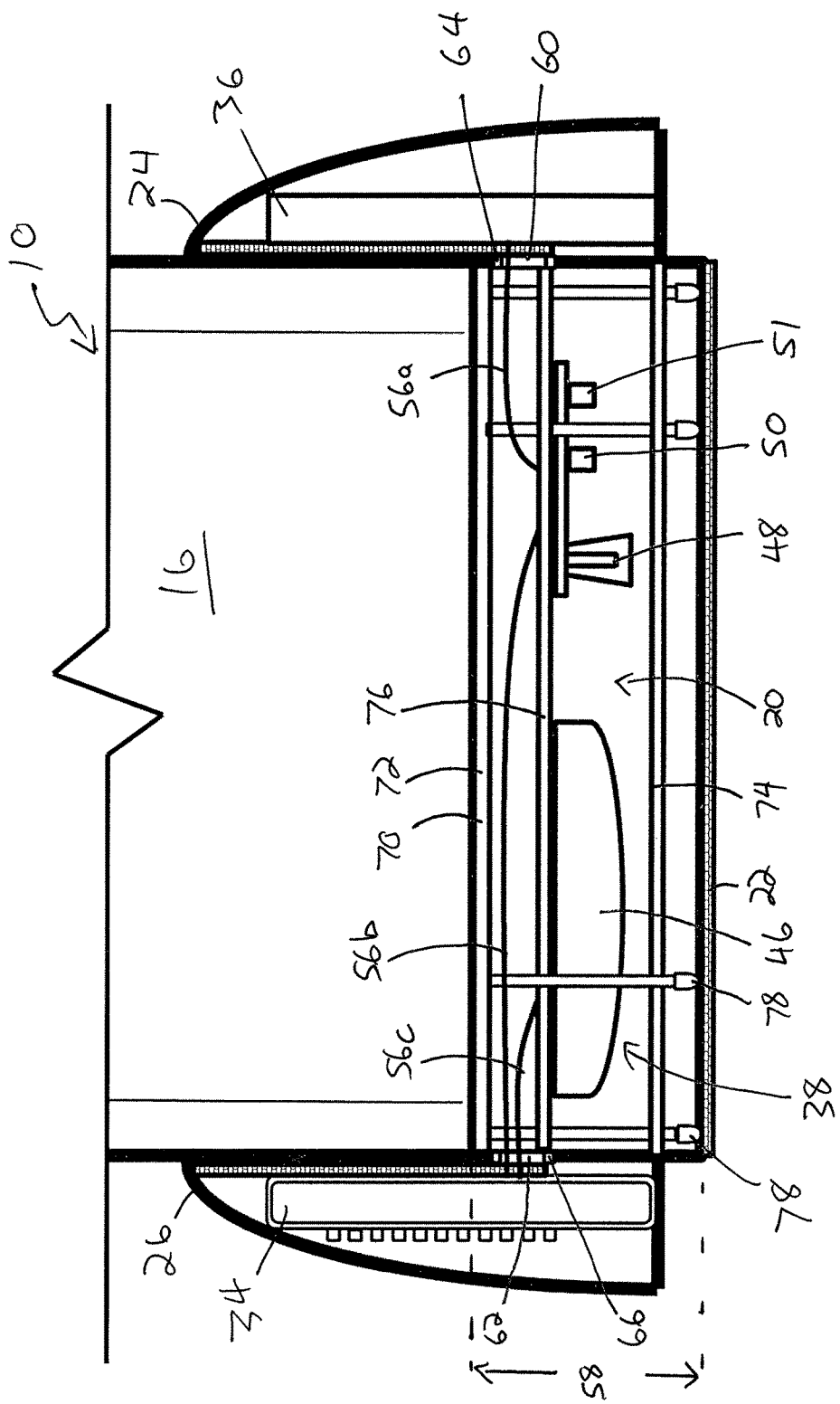
FIG. 8 is a detailed view of the data communications components of FIG. 7.

A power switch 48, a main fuse 50, and an auxiliary fuse 51 can also be secured within the backpack carrier 12. The power switch 48 can be in electrical communication with the power supply 36 and the router device 34, as shown in FIGS. 7-8, and the power switch 48 can be selectively toggled by a user to turn on apparatus 10 and supply power from power supply 36 to router device 34. Main fuse 50 and auxiliary fuse 51 can be utilized to power additional electrical devices if desired, for instance external lighting sources, which can be beneficial in times of power outages or in remote locations away from electrical power grids.

The power supply 36, router device 34, power switch 48, main fuse 50, auxiliary fuse 51, and the antennas of the antenna array 38 can be connected to one another by low voltage (approximately 9V to 36V) electrical wiring 56 that is coated with a suitable insulating material (e.g., flame-retardant polyvinyl chloride), having an approximate thickness of 0.007-0.011 inches. An insulated coating on the electrical wiring can help reduce electromagnetic interference between the wiring, as well as with other electrical components of apparatus 10. It can also be advantageous to utilize cables having as short as a length as possible to avoid attenuation. It can also be advantageous to utilize low attenuation cables. Alternatively, the various components inside the backpack carrier 12 may be interconnected wirelessly.

The apparatus 10 can include an AC/DC adapter in some embodiments. The power supply 36 can be connected to the power adapter and the adapter can be plugged into an external power grid in order to recharge the power supply 36 between uses of apparatus 10, or while apparatus 10 is being used and the power supply 36 is depleted. In some embodiments, apparatus 10 can include a second power supply which can be a second standalone power supply such as a battery or load cell which can be connected to power supply 36. A second standalone power supply can help prolong the usable life of apparatus 10 when apparatus 10 is used in remote areas or areas without access to a utility power grid. In some embodiments, the second standalone power supply can be configured to provide multiple days of additional power to apparatus 10.

Referring again to FIGS. 1-4 and 7-8, the backpack carrier 12 can also include a lower compartment 20 positioned beneath the central storage area 16. In some embodiments, the lower compartment 20 can have a depth 58. The depth 58 can be at least four inches. In some embodiments, the lower compartment 20 can be separated from the central storage area 16. For instance, the central storage area 16 can include a fabric or hard plastic bottom which can separate the central storage area 16 from the lower compartment 20. The lower compartment 20 can include a lower cover 22 which can be selectively secured over the lower compartment 20 to enclose the lower compartment 20. As such, in some embodiments, the lower compartment 20 can be accessed independently from the central storage area 16, the central storage area 16 being accessed via the upper opening 14 and the lower compartment 20 accessed by opening the lower cover 22. The lower cover 22 can be separately removable.

In the embodiment shown in FIGS. 1-4, the backpack carrier 12 can include one or more side pockets 24 and 26. Side pockets on backpack carrier 12 can be positioned on one or more of a front 28, a first lateral side 30, or a second lateral side 32 of the backpack carrier 12. In some embodiments, a first side pocket 24 can be positioned on the first lateral side 30 of the backpack carrier 12 and a second pocket 26 can be positioned on the second lateral side 32 of the backpack carrier 12. The side pockets 24 and 26 can be sized to receive and store various components of the data communications backpack apparatus 10.

The electrical components of the apparatus 10, including but not limited to the antenna array 38, the router device 34, the power supply 36, and the power switch 48 can be positioned within the lower compartment 20 and the side pockets 24 and 26 of the backpack carrier 12 such that the apparatus 10 can be equipped with data communications equipment which is separate from the central storage area 16 of the backpack carrier 12. As such, the apparatus 10 can double as a conventional backpack for storing and carrying personal items, as well as a data communications unit which can be utilized for cellular, wireless, and GPS data communication.

Referring now to FIGS. 1-4 & 7-8, in some embodiments, the power supply 36 can be positioned in the first side pocket 24, and the router device 34 can be positioned within the second side pocket 26. The antenna array 38, the antenna housing 46, and the power switch 48 can be positioned within the lower compartment 20. In such embodiments, the backpack carrier 12 can include one or more apertures 60 and 62 defined within the internal sidewalls of the backpack carrier 12. A first aperture 60 can be positioned to communicate and allow passage of electrical cables between the lower compartment 20 and the first side pocket 24, and a second aperture 62 can be positioned to communicate and allow passage of electrical cables between the lower compartment 20 and the second side pocket 26, as shown in FIGS. 7-8 and 10-11. In some embodiments, a first grommet 64 can be positioned in and can define the first aperture 60, and a second grommet 66 can be positioned in and can define the second aperture 62. First and second grommets 64 and 66 can be rigid grommets made from any suitable rigid material such as metal or plastic. Rigid grommets 64 and 66 can provide support and structure around the first and apertures 60 and 62 respectively.

Wires connecting the various components of the data communications backpack apparatus 10 can extend through the apertures 60 and 62 in order to connect the various components of the apparatus 10 together. For instance in some embodiments, the power source 36 and the router device 34 are positioned in different side pockets 24 and 26 of the backpack carrier 12, and the power source 36 and the router device 14 can be electrically connected via one or more electrical cables extending through the first aperture 60 and the second aperture 62. In some embodiments, the router device 34 and the power source 36 can be electrically communicated via a power switch 48 positioned in the lower compartment 20. In such embodiments, a first electrical cable 56*a* can extend from the power supply 36 to the power switch 48, the first electrical cable 56*a* passing through the first aperture 60, and a second electrical cable 56*b* can extend from the router device 34 to the power switch 48, the second electrical cable 56*b* passing through the second aperture 62. One or more electrical antenna cables 56*c* can extend from the router device 34 to the antenna array 38, the antenna cables 56*c* also passing through the second aperture 62, such that the router device 34 and the antenna array 38 are electrically communicated via one or more electrical cables extending through the second aperture 62.

In some embodiments, as shown in FIGS. 2-4 and 7-8, the antenna array 38 and/or several other electrical components of the apparatus 10 can be mounted to a support frame 70 or placed within the support frame 70. The support frame 70 can be sized to snugly fit within the lower compartment 20, or anywhere else within the backpack carrier 12. The support frame 70 can provide protection for one or more electrical components connected to it such that if an external force is placed upon the backpack carrier 12, for instance if the carrier 12 is dropped or thrown, the support frame 70 can help prevent damage to the components of the unit positioned on or within the support frame 70.

In some embodiments, the support frame 70 can include an upper frame member 72 and a lower frame member 74, with one or more electrical components of the data communications unit mounted to the support frame 70 on or between the upper and lower frame members 72 and 74. In some embodiments, the support frame 70 can further include an intermediate plate member 76 suspended between the upper and lower frame members 72 and 74. One or more of the electrical components can be mounted to the intermediate frame member 76, such that the components can be located between upper and lower outer frame members 74 and 76. The upper and lower plate members 74 and 76 can provide protection for one or more of the components of the data communication backpack apparatus 10 against forces applied on the data communications backpack apparatus 10 from multiple directions. In some embodiments, the upper and lower outer frame members 72 and 74 can include a substantially even top surface 72*a* and bottom surface 74*a*, respectively, that can be used as a work surface when the support frame 70 is removed from the backpack carrier 12. The frame members 72, 74, and 76 of the support frame 70 may include a rigid material designed to withstand various stresses placed on the support frame 70. In other embodiments, the frame members 72, 74, and 76 can include both rigid and resilient portions to withstand and absorb various stresses placed on the support frame 70.

In some embodiments, as shown in FIGS. 7-8, the electrical components in the lower compartment 20 can be connected to the intermediate frame member 76 and extend toward the lower frame member 74, and electrical cables connecting the electrical components in the lower component together, as well as cables connecting the components in the lower compartment to other components in the side pockets 24 and 26, can be positioned and can extend between the intermediate plate 76 and the upper plate 72. As such, when the support frame 70 is positioned in the lower compartment 20, the electrical cables can be hidden from the observer's view behind the intermediate frame member 76. In some embodiments, the electrical components may also be positioned between intermediate frame member 76 and upper plate 72 and the cables may be positioned between intermediate frame 76 and lower plate 74. In still other embodiments, the components and the cables may be positioned between any two frame members.

Figure 9:
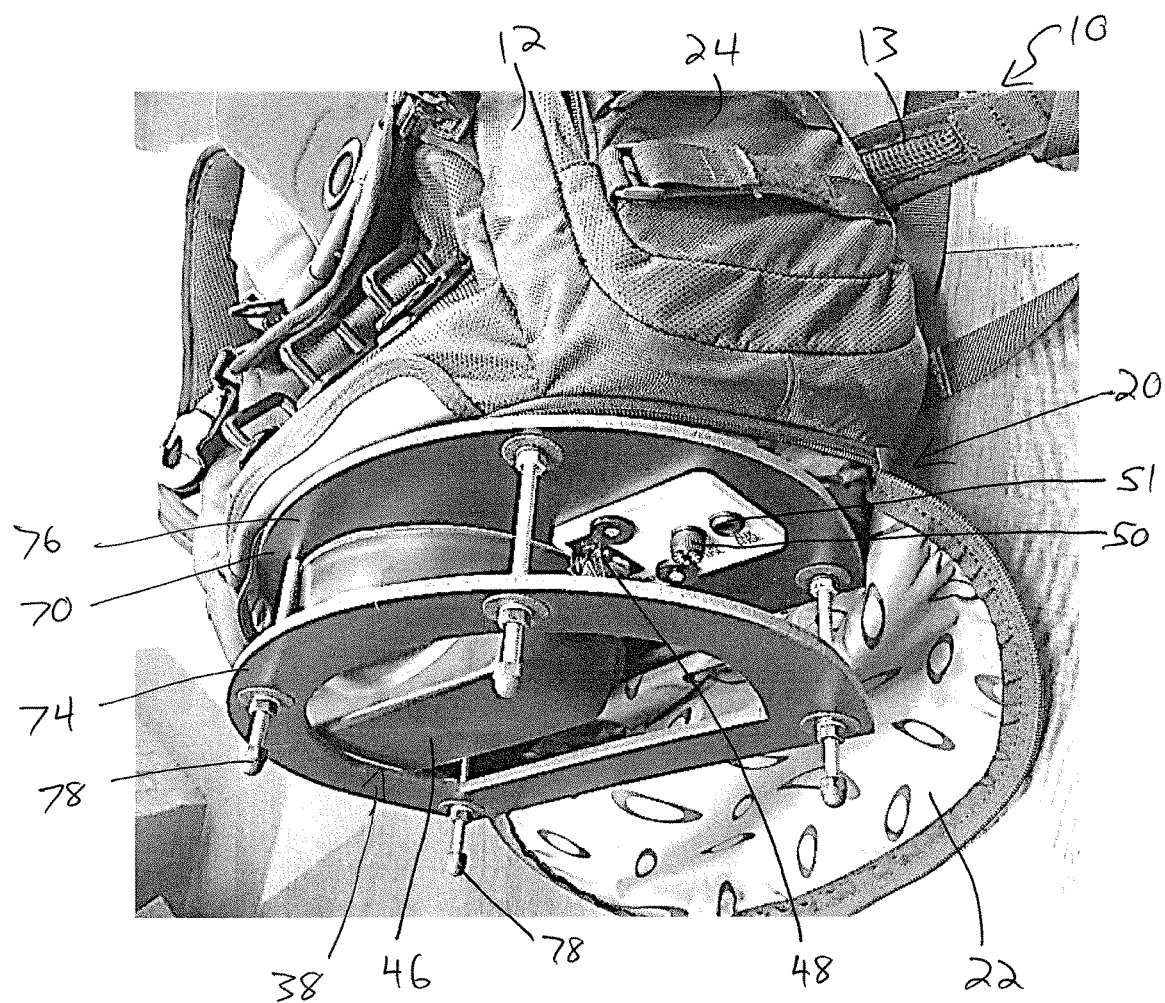
FIG. 9 is a perspective view of the apparatus of FIG. 1 with a support frame and antenna array being removed from a lower compartment of the apparatus.
Figure 10:
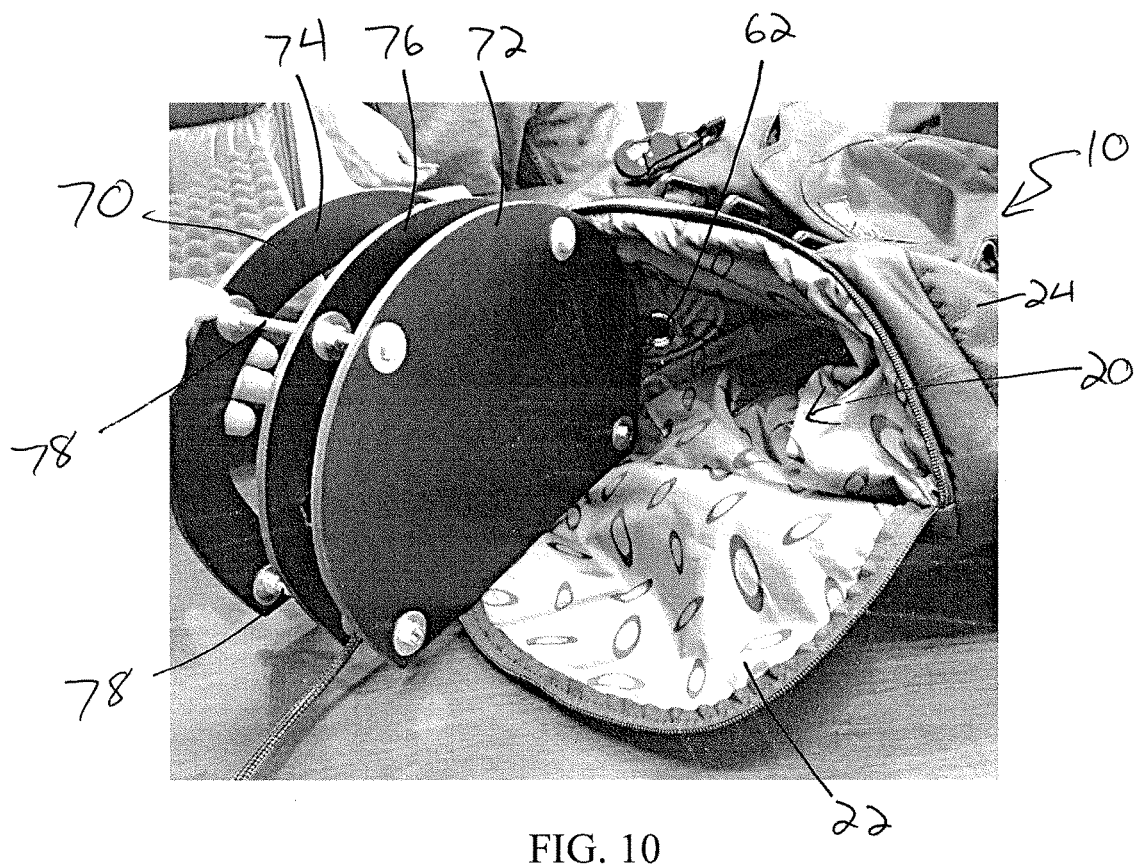
FIG. 10 is a perspective view of the apparatus of FIG. 9 showing the inside of the lower compartment with the antenna array removed.
Figure 11:
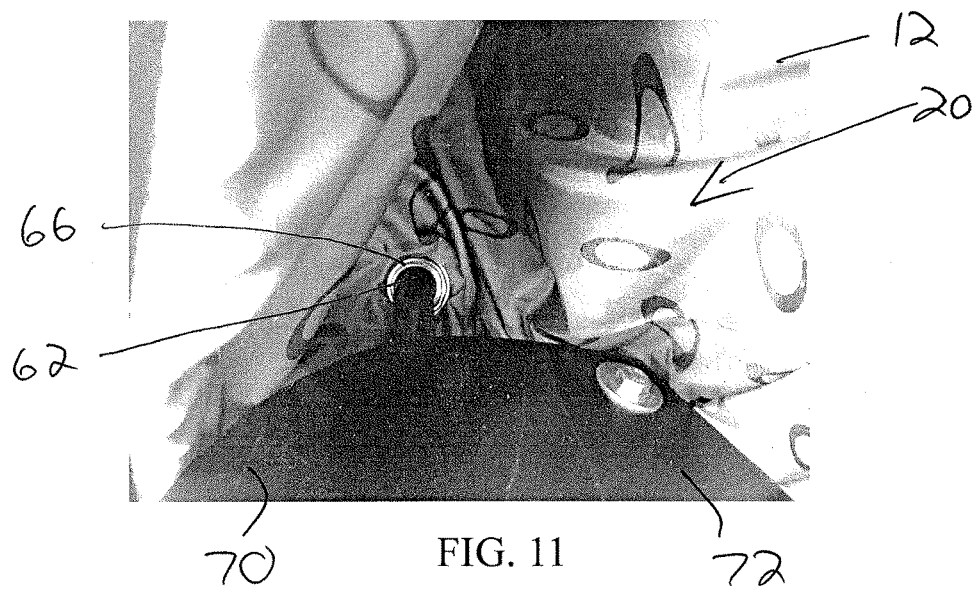
FIG. 11 is a detailed view of an aperture defined between the lower compartment and a side pocket of the backpack carrier.

In some embodiments, the upper, lower, and intermediate frame members 72, 74, and 76 can be rigid plates or have a flat, plate-like shape such that the frame members 72, 74, and 76 can span across the lower compartment 20 and can extend beyond the electrical components positioned in the lower compartment 20 to provide adequate protection for the components mounted within the support frame 70. As shown in FIGS. 4 and 9, in some embodiments the lower frame member 72 can include an access opening and can be substantially ring-shaped. Other frame members can include similar access openings which can be variously shaped and sized. One or more access openings in the frame members can provide access to various components of the apparatus. For instance, an access opening in a lower frame member 72 in FIGS. 4 and 9 can provide a user access to the power switch 48 on the intermediate plate 46 such that a user can selectively turn on the data communications equipment of the apparatus 10. One or more access openings in the frame members can in other embodiments provide access to various components of the apparatus for connection of electrical cables or power cables or other connectors to those components, or provide access to such components for other purposes (e.g., maintenance, replacement of components, etc.).

In some embodiments, a plurality of legs 78 can connect the members of the support frame 70 together. The upper, lower, and intermediate frame members 72, 74, and 76 respectively can be connected to the plurality of legs 78 such that the upper and lower frame members 72 and 74 are spaced apart from one another on the plurality of legs 78 and the intermediate frame member 76 is positioned between and spaced apart from the upper and lower frame members 72 and 74. The plurality of legs 78 can extend below the lower frame member 74 in some embodiments, such that when the backpack carrier 12 is positioned on the ground, the support frame 70 can rest on the legs 78, the legs 78 elevating the support frame 70 and the electrical components contained thereon off of the ground. The legs 78 can be made from a lightweight metal such as aluminum or titanium or another suitable lightweight metal alloy. The legs 78 can also be made from other materials such as plastics, polymers, or other suitable compounds.

Figure 14:
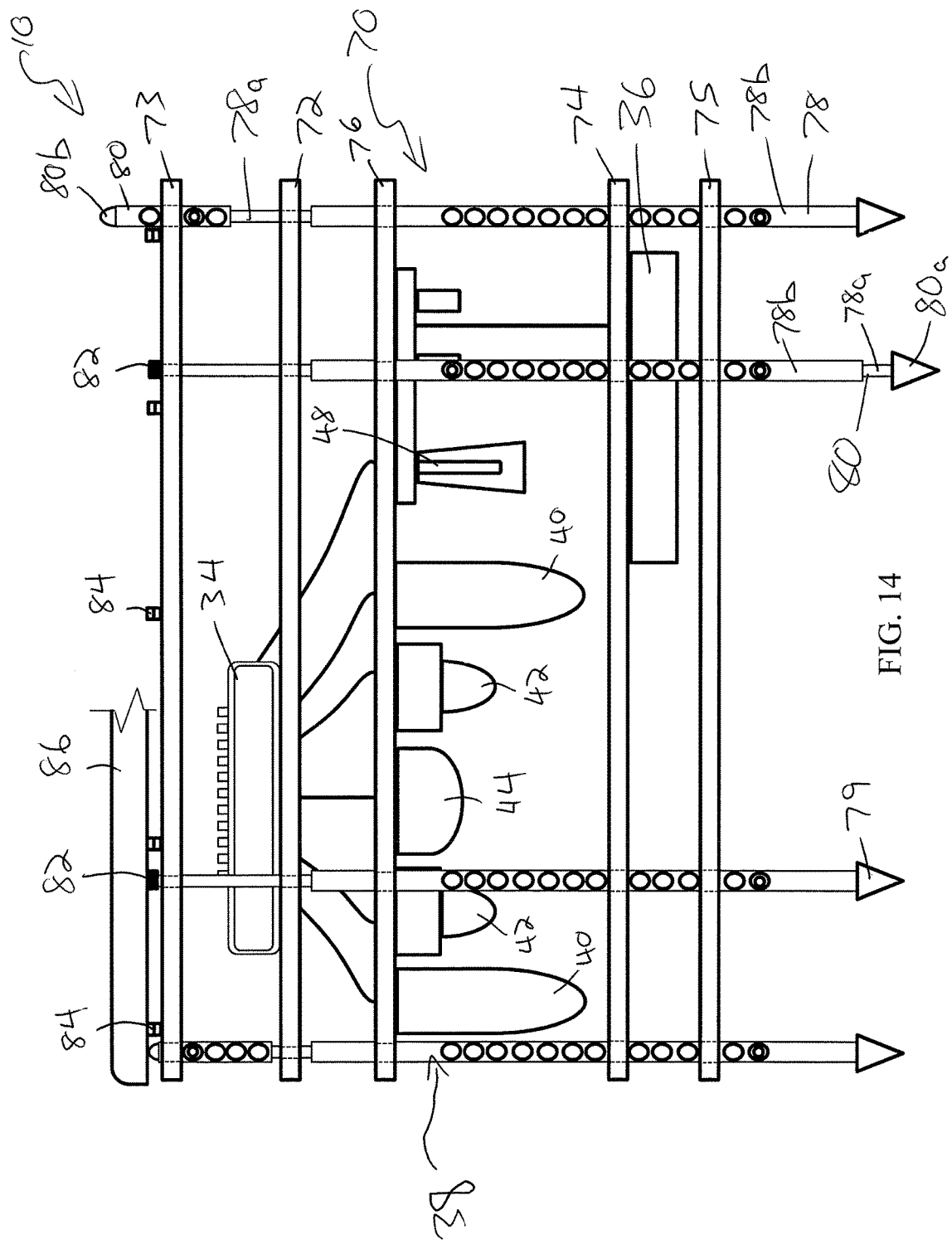
FIG. 14 is a detailed view of another embodiment of a support frame for a backpack carrier apparatus including additional outer frame members.

As shown in FIG. 14, the legs 78 may be shaped as a stake 79 so that the support frame 70 can be anchored into the ground. One or more of the legs 78 can also include an inner leg member 78a and an outer leg member 78b, the inner member 78a being slidable relative to the outer leg member 78 and can be used to increase the length of the legs 78. One or more of the legs 78 may be extendable in both directions along its length in some embodiments. The legs 78 may be extended to further elevate the support frame 70 off the ground. The legs 78 may also be independently extendable to a plurality of different lengths so that the support frame 70 can be leveled when placed on uneven ground or terrain. The legs may also be extendable in some embodiments to create more space between adjacent support members to accommodate electrical components of different sizes as needed. The legs 78 may also be configured to receive various other extension components. For example, legs 78 may be configured to be connectable to various extensions 80, such as a stake extension 80a, or a hook extension 80b, for anchoring the support frame 70 to the ground or hanging the support frame 70 from an object such as a tree, fence, etc. In some embodiments, the ends of one or more of the legs 78 may also contain magnets 82 such that the support frame 70 can be secured to a magnetic surface.

The legs 78 may be designed to support significant weight, such as the weight of a human, so that the support frame 70 may be used as a seat when the support frame is removed from the backpack carrier. In some embodiments, one of the outer frame members may include a fastener or multiple fasteners 84 for connecting a seat cushion 86 to the support frame 70 for added comfort when the support frame 70 is used as a seat.

As shown in FIG. 14, the support frame 70 may comprise a second upper outer frame member 73 and/or a second lower outer frame member 75. One or more electrical components, including the power supply 36, the router device 34, the antenna array 36, and/or one or more electrical cables can be positioned between the upper outer frame member 72 and the second upper outer frame member 73, or between the lower outer frame member 74 and the second lower outer frame member 75. FIG. 14 shows the router device 34 between first and second outer upper frame members 72 and 73 and the power supply 36 between first and second lower outer frame members 74 and 75. The electrical components in other embodiments can be in numerous configurations on or between frame members 72, 73, 74, 75, and 76.

FIGS. 1-14 show various components, including power supply 36, router device 34, antenna array 38, cellular antennas 40, wireless antennas 42, GPS antennas 44, power switch 48, etc., in various orientations and positions within the lower compartment 20 and side pockets 24 and 26 of backpack carrier 12. In other embodiments, the communications components of the apparatus 10 can be positioned in numerous other orientations within the side pockets 24 and 26 and lower compartment 20. For instance, in some embodiments, the router device 34 and the power supply 36 can also be mounted to a support frame 70 such that all data communications components can be mounted on and protected by the support frame 70. In other embodiments, the antenna array 38 can be positioned in one of the side pockets 24 and 26 and either the power supply 36 or the router device 34, or both, can be positioned within the lower compartment 20 and mounted to the support frame 70.

Figure 15:
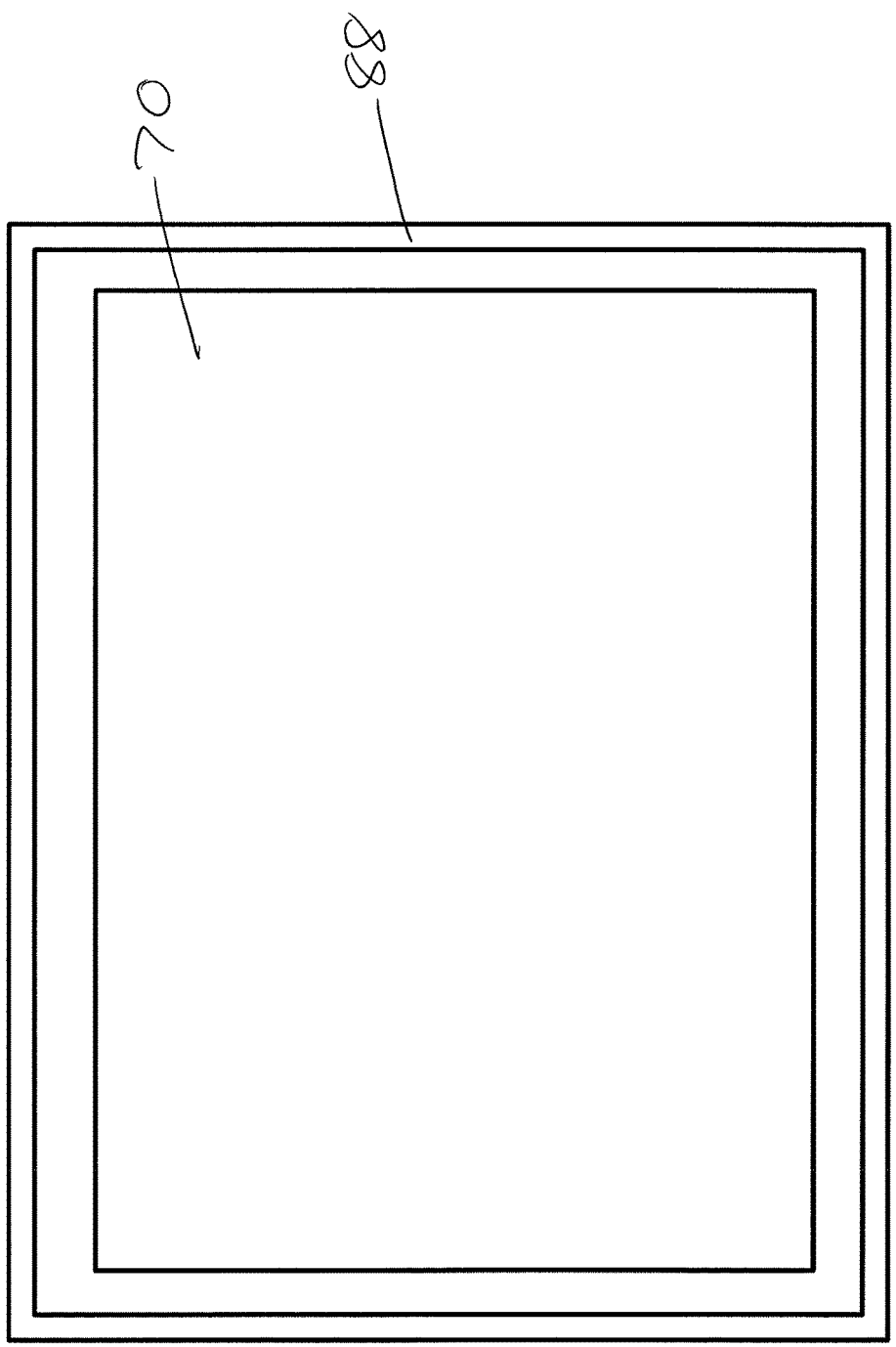
FIG. 15 is a detailed view of the support frame of FIG. 14 positioned inside a support frame enclosure.

As shown in FIG. 15, the support frame 70 may be enclosed in a weather proof and sealable bag, container, or other enclosure 88 inside the backpack carrier. The support frame enclosure 88 may be sewn, fastened, or otherwise secured inside the backpack carrier. The support frame enclosure 88 may also be made of an antiballistic material such as a Kevlar or Lexan material or a suitable composite fiber material. In some embodiments, the support frame enclosure 88 can be selectively opened such that the support frame 70 and the electrical components thereon can be removed for maintenance, repair, inspection, etc. The support frame enclosure 88 can provide additional weather and impact protection for the electrical components of the apparatus 10.

The data communications backpack apparatus 10 disclosed herein can conveniently provide data communications equipment within a conventional backpack type carrier. A user can store personal or business items such as clothes, electronic devices, laptops, cell phones, rain gear, camping gear, books, etc. within the central storage area of the apparatus 10. The data communications equipment can also allow a user to transmit cellular, wireless, and GPS data when the user is in remote locations away from a power grid and conventional communications systems, or when conventional communications systems are not available, such as in a disaster or emergency situation. An apparatus that can allow for storage of personal items as well as data communications equipment can be of particular use for emergency responders such as policemen, fireman, paramedics, etc. who may utilize the data communications backpack of the present disclosure in emergency situations. The data communications backpack can also be beneficial to users such as campers, hikers, park rangers, etc. who may frequently venture into remote locations where conventional communications systems are not available.

Thus, although there have been described particular embodiments of the present invention of a new and useful DATA COMMUNICATIONS BACKPACK, it is not intended that such references be construed as limitations upon the scope of this invention.

What is claimed is:

1. A data communications backpack apparatus comprising:
    a backpack carrier having:
        an upper opening extending into a central storage area;
        a first side pocket defined on the backpack carrier;
        a second side pocket defined on the backpack carrier; and
        a lower compartment defined below and separated from the central storage area;
    a power supply positioned in the first pocket;
    a router device positioned in the second pocket, the router device in electrical communication with the power supply;
    a rigid support frame positioned within the lower compartment, the rigid support frame including at least one frame member substantially spanning across the lower compartment; and
    an antenna array positioned in the lower compartment and mounted on the at least one frame member of the rigid support frame, the antenna array in electrical communication with the router device, the antenna array including one or more cellular antennas and one or more wireless networking antennas.

2. The apparatus of claim 1, further comprising:
    a first aperture positioned between the first pocket and the lower compartment to allow electrical cables to pass between the first pocket and the lower compartment; and
    a second aperture positioned between the second pocket and the lower compartment to allow electrical cables to pass between the second pocket and the lower compartment.

3. The apparatus of claim 2, wherein:
    the power supply and the router device are electrically communicated via one or more electrical cables extending through the first and second apertures.

4. The apparatus of claim 2, wherein:
    the router device and the antenna array are electrically communicated via one or more electrical cables extending through the second aperture.

5. The apparatus of claim 2, further comprising:
    a first rigid grommet positioned in and defining the first aperture; and
    a second rigid grommet positioned in and defining the second aperture.

6. The apparatus of claim 1, further comprising a power switch mounted to the support frame.

7. The apparatus of claim 1, wherein the support frame further comprises a plurality of legs extending from the support frame.

8. The apparatus of claim 1, further comprising:
    a power switch positioned inside the lower compartment, the power supply and router device in electrical communication with the power switch;
    wherein the power switch is selectively operable to provide power from the power supply to the router device, such that the power supply and the router device are in electrical communication via the power switch.

9. The apparatus of claim 1, further comprising an internal pocket defined within the central storage area.

10. The apparatus of claim 1, wherein the antenna array includes an antenna housing, each of the two cellular antennas and each of the two wireless networking antennas positioned within the antenna housing.

11. The apparatus of claim 1, wherein the antenna array further comprises at least one Global Positioning System antenna.

12. The apparatus of claim 1, wherein:
    the backpack carrier includes a first lateral side and a second lateral side;
    the first side pocket is positioned on the first lateral side of the backpack carrier; and
    the second side pocket is positioned on the second lateral side of the backpack carrier.

13. A data communications backpack apparatus comprising:
    a backpack carrier;
    a rechargeable power supply positioned in the backpack carrier;
    a router device positioned in the backpack carrier, the router device in electrical communication with the power supply, the router device configured to enable two or more segmented wireless networks, each wireless network having a separate service set identifier (SSID), wherein each SSID can accommodate multiple users; and
    an antenna array positioned in the backpack carrier, the antenna array in electrical communication with the router device, the antenna array including at least two cellular antennas and at least two wireless networking antennas.

14. The apparatus of claim 13, wherein:
    the backpack carrier further comprises an upper opening extending into a central storage area and a lower compartment defined below the central storage area; and
    the antenna array is positioned within the lower compartment of the backpack carrier.

15. A data communications backpack apparatus comprising:
    a backpack carrier having:
        an upper opening extending into a central storage area;
        a first side pocket defined on the backpack carrier;
        a second side pocket defined on the backpack carrier; and
        a lower compartment defined below the central storage area;
    a power supply positioned in the first side pocket;
    a router device positioned in the second side pocket and electrically communicated with the power supply;
    a support frame positioned within the lower compartment of the backpack carrier, the support frame including at least one rigid frame member and a plurality of legs extending from the rigid frame member; and
    an antenna array mounted to the at least one rigid frame member of the support frame, the antenna array in electrical communication with the router device, the antenna array including at least two cellular antennas and at least two wireless networking antennas.

16. The apparatus of claim 15, further comprising a power switch mounted to the support frame, the power supply and the router device electrically communicated via the power switch.

17. The apparatus of claim 15, wherein the support frame further comprises:
an upper frame member; and
a lower frame member;
wherein the antenna array is positioned between the upper frame member and the lower frame member.

18. The apparatus of claim 17, wherein the upper and lower frame members are spaced from one another by the plurality of legs, the plurality of legs extending below the lower frame member.

19. The apparatus of claim 18, wherein the support frame further comprises an intermediate frame member suspended between and spaced from the upper and lower frame members by the plurality of legs, the antenna array mounted to the intermediate frame member.

* * * * *